(12) United States Patent
Csurka et al.

(10) Patent No.: US 9,524,127 B2
(45) Date of Patent: Dec. 20, 2016

(54) METHOD AND SYSTEM FOR MANAGING PRINT JOBS

(71) Applicant: Xerox Corporation, Norwalk, CT (US)

(72) Inventors: Gabriela Csurka, Crolles (FR); Jutta K. Willamowski, Grenoble (FR); Yves Hoppenot, Notre dame de Mesage (FR)

(73) Assignee: Xerox Corporation, Norwalk, CT (US)

( * ) Notice: Subject to any disclaimer, the term of this patent is extended or adjusted under 35 U.S.C. 154(b) by 157 days.

(21) Appl. No.: 13/677,341

(22) Filed: Nov. 15, 2012

(65) Prior Publication Data

US 2014/0132976 A1    May 15, 2014

(51) Int. Cl.
*G06K 15/00* (2006.01)
*G06F 3/12* (2006.01)

(52) U.S. Cl.
CPC ........... *G06F 3/1219* (2013.01); *G06F 3/1273* (2013.01); *G06F 3/1274* (2013.01); *G06F 3/1288* (2013.01); *G06F 3/126* (2013.01)

(58) Field of Classification Search
CPC ...................................................... G06K 15/02
See application file for complete search history.

(56) References Cited

U.S. PATENT DOCUMENTS

| | | | |
|---|---|---|---|
| 6,667,810 B1 | 12/2003 | Jeyachandran et al. | |
| 6,795,207 B1 | 9/2004 | Bates et al. | |
| 6,819,445 B1 * | 11/2004 | Stevenson et al. | 358/1.15 |
| 7,187,478 B2 * | 3/2007 | Mikame et al. | 358/468 |
| 7,580,149 B2 | 8/2009 | Monga et al. | |
| 7,623,256 B2 | 11/2009 | Ciriza et al. | |
| 7,639,405 B2 | 12/2009 | Jeyachandran et al. | |
| 7,680,341 B2 | 3/2010 | Perronnin | |
| 7,865,089 B2 | 1/2011 | Andreoli et al. | |
| 8,074,124 B2 | 12/2011 | Bouchard et al. | |
| 8,145,073 B2 | 3/2012 | Bouchard et al. | |
| 2006/0092432 A1 * | 5/2006 | Ferlitsch | 358/1.1 |
| 2007/0138283 A1 * | 6/2007 | Dymetman et al. | 235/454 |
| 2010/0002262 A1 * | 1/2010 | Kondo | G06F 3/1208 358/1.15 |
| 2010/0008581 A1 * | 1/2010 | Bressan | 382/177 |
| 2010/0189354 A1 | 7/2010 | DeCampos et al. | |
| 2010/0245899 A1 * | 9/2010 | Hirama | 358/1.15 |
| 2011/0075191 A1 | 3/2011 | Meunier et al. | |

(Continued)

OTHER PUBLICATIONS

"A Metric for Distributions with Applications to Image Databases", by Jossi Rubner; Carlo Tomasi, Leonidas J. Guibas, in Proceedings ICCV 1998.

(Continued)

*Primary Examiner* — Marivelisse Santiago Cordero
*Assistant Examiner* — Neil R McLean
(74) *Attorney, Agent, or Firm* — Jones Robb, PLLC

(57) ABSTRACT

A method and system for managing print jobs is disclosed. A received print job is compared with pending print jobs and executed print jobs, wherein the pending print jobs and the executed print jobs are stored in one or more print queues associated with one or more printing systems. Thereafter, one or more pending print jobs are suspended if the one or more pending print jobs are found similar to the received print job based on the comparison; or the received print job is suspended if the received print job is found similar to one or more of the executed print jobs, based on the comparison.

19 Claims, 5 Drawing Sheets

(56) References Cited

U.S. PATENT DOCUMENTS

2012/0033250 A1* 2/2012 Grasso et al. ............... 358/1.15
2012/0314249 A1* 12/2012 Poxon et al. ............... 358/1.15

OTHER PUBLICATIONS

Jay M. Ponte, titled "A language modelling approach to information retrieval", in SIGIR, pp. 275-281, (ACM 1998).
U.S. Appl. No. 13/644,187, filed Oct. 3, 2012 by Singh et al; "System and Method for Labeling Alert Messages From Devices for Automated Management".

* cited by examiner

METHOD AND SYSTEM FOR MANAGING PRINT JOBS

TECHNICAL FIELD

The presently disclosed embodiments are related to management of print jobs. More particularly, the presently disclosed embodiments are related to a method and system for preventing unnecessary re-printing of documents.

BACKGROUND

In an environment in which computers and a set of printers are connected in a network, and where the printers are managed by one or more print servers, it is often the case, that a printer is unable to print a print job due to any hardware or software-related issue in the printer. Consequently, all print jobs in the printer's queue are blocked or delayed. In many cases depending on the originating users' time schedules and frustration level, the users send their concerned documents to another printer. However, the original print jobs remain in the print queue and when the printer's malfunctioning is resolved and/or the preceding print jobs in the print queue have been processed, those print jobs are subsequently printed and result in a waste of paper.

It is also observed, that even if these documents are not resent to another printer, if the delay is too long, the user might find another way of accessing or reading the document (e.g., consulting the electronic format on screen) and abandon the printed document anyway.

Further, the users often request a printout with a default printer and notice that the printer's setting did not fit the user's need, therefore instead he selects another, more appropriate printer, for instance a printer able to provide the required finishing capabilities or color. In that case the user re-prints the document on another printer. Also, users sometimes launch the print job too quickly and decide right after to make some additional changes to do in the document. They will then do the corrections and print the document again. In both cases, if both prints are executed, one of them will be a waste copy.

SUMMARY

According to embodiments illustrated herein, there is provided a method for managing a print job. The method comprises receiving the print job from a computing device, wherein the received print job comprises an electronic document intended to be printed. The received print job is then compared with pending print jobs and executed print jobs. The comparison is performed based at least in part on content of the electronic document. One or more pending print jobs are suspended if the one or more pending print jobs from the pending print jobs are similar to the received print job, or the received print job is suspended if the received print job is similar to one or more of the executed print jobs. Thereafter, the one or more suspended pending print jobs or the suspended received print job is deleted based on a confirmation by a user or elapse of a predefined time period.

According to embodiments illustrated herein, there is provided a system for managing a print job. The system comprises a print queue observer module, a job management module, and a notification module. The print queue observer module is configured for comparing a received print job with pending print jobs and executed print jobs. The print queue observer module performs the comparison based at least in part on content of an electronic document contained in the received print job. The job management module is configured for performing at least one of: suspending one or more pending print jobs if the one or more pending print jobs from the pending print jobs are similar to the received print job, or suspending the received print job if the received print job is similar to one or more of the executed print jobs. The notification module is configured for generating a notification message asking a user for allowing deletion or printing of the one or more suspended pending print jobs or the suspended received print job.

According to embodiments illustrated herein, there is provided a computer program product for use with a computer. The computer program product comprises a computer-usable data carrier storing a computer-readable program code embodied therein for managing a print job. The computer-readable program code comprises program instruction means for comparing a received print job with pending print jobs and executed print jobs, wherein the pending print jobs and the executed print jobs are stored in one or more print queues associated with one or more printing systems. The comparison is performed based at least in part on content of an electronic document contained in the received print job. The computer-readable program code also comprises program instruction means for performing at least one of: suspending one or more pending print jobs if the one or more pending print jobs are similar to the received print job; or suspending the received print job if the received print job is similar to one or more of the executed print jobs. The computer-readable program code further includes a program instruction means for deleting the one or more suspended pending print jobs or the suspended received print job based on a confirmation by a user, or elapse of a predefined time period.

BRIEF DESCRIPTION OF DRAWINGS

The accompanying drawings illustrate various embodiments of systems, methods, and various other aspects of the invention. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
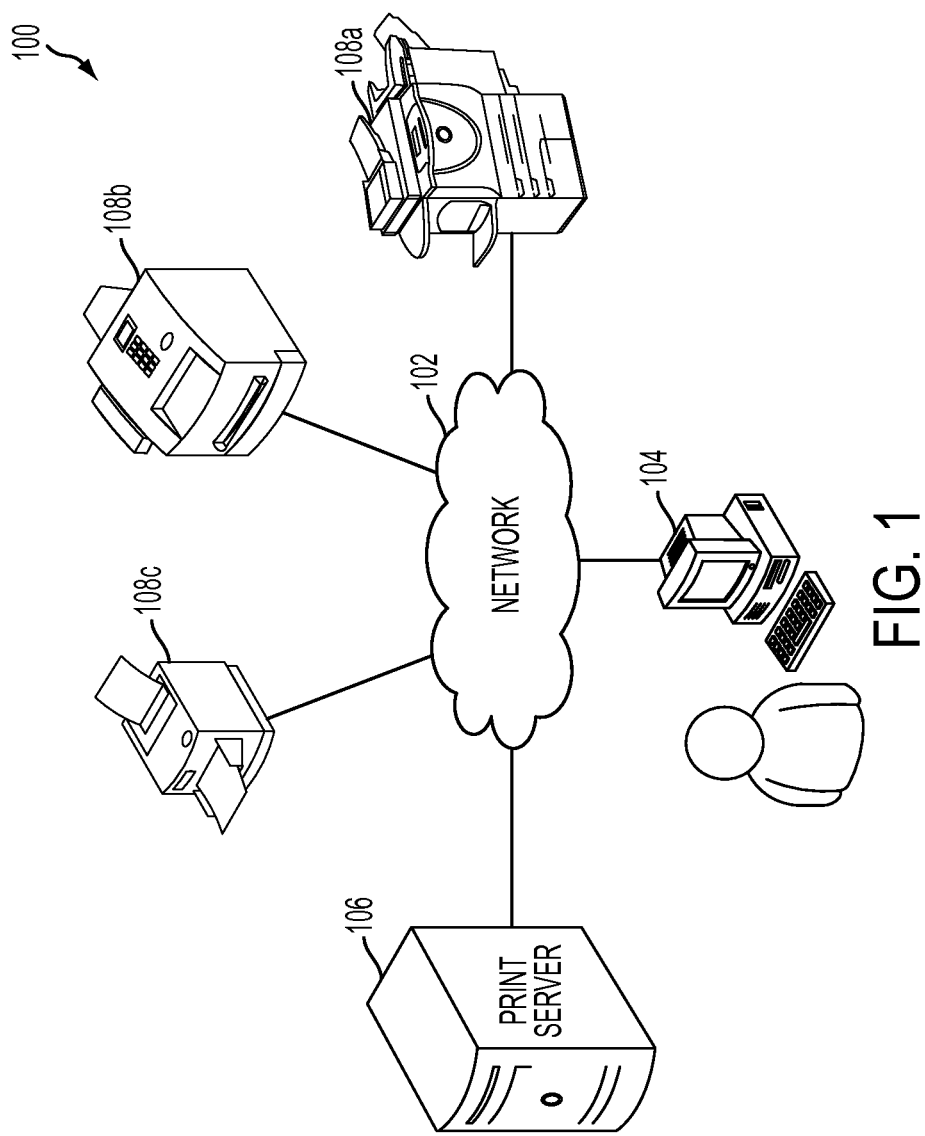
FIG. 1 is a block diagram illustrating a system environment, in accordance with at least one embodiment.

The present disclosure is best understood with reference to the detailed figures and description set forth herein.

Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

A "network" refers to a medium that interconnects various computing devices, a print server, and one or more printing systems. Examples of the network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), and IEEE 802.11n communication protocols.

A "computing device" refers to a computer, a device including a processor/microcontroller and/or any other electronic component, or a device or a system that performs one or more operations according to one or more programming instructions. Examples of the computing device include, but are not limited to, a desktop computer, a laptop, a personal digital assistant (PDA), a tablet computer (e.g., iPad®, Samsung Galaxy Tab®), and the like. The computing device is capable of accessing the print server and the one or more printing systems over the network (e.g., using wired or wireless communication capabilities).

"Printing" or "print operation" or "print function" refers to a technique of reproducing various illustrations, including, but not limited to image, text, or symbols, on a surface (e.g., paper or any physical surface). According to this disclosure, the types of printing include, but are not limited to, printing on a paper, micro printing, and microfilm printing which are human readable, perhaps with magnification.

A "print job" refers to a request for printing an electronic document. In an embodiment, the print job includes the electronic document to be printed.

A "print queue" refers to a reserved area of memory that holds pending print jobs corresponding to each printing system. In an embodiment, in addition to the pending print jobs, the print queue also holds a list of executed print jobs. In an embodiment, the print queue is managed by the print server. In an embodiment, a separate print queue is maintained for each printing system. In an embodiment, a common print queue is maintained for all printing systems.

A "printing system" refers to an electronic system capable of printing. Various examples of printing systems include, but are not limited to, a printer and a multifunction device (MFD).

A "multifunction device" (MFD) refers to a device that can perform multiple functions. Examples of the functions include, but are not limited to, printing, scanning, copying, faxing, emailing, and the like.

A "pending print job" refers to a print job that is waiting to be printed.

An "executed print job" refers to a print job that had been executed (i.e., printed) on any printing system.

An "electronic document" refers to information recorded in a manner that requires a computing device or other electronic device to display, interpret, and process it. Electronic documents are intended to be used in either an electronic form or as printed output. In an embodiment, the electronic document includes one or more of text (handwritten or typed), image, symbols, and so forth.

A "filename" refers to metadata about electronic document. The filename is a string of characters to uniquely identify electronic document.

"File size" refers to memory space occupied by the electronic document. Generally, file size is measured as number of bytes (e.g., kilobyte, megabyte, gigabyte, terabyte, and so on).

"Document length" refers to the number of pages of the electronic document independently of the way it will be printed; duplex or simplex.

FIG. 1 is a block diagram illustrating a system environment 100 in accordance with at least one embodiment. Various embodiments of the methods and systems for managing print jobs are implementable in the system environment 100. The system environment 100 includes a network 102, a computing device 104, and a print server 106. The system environment 100 further includes a printer 108a, an MFD 108b, and an MFD 108c (hereinafter referred to as printing systems 108). Although FIG. 1 shows only one computing device for simplicity, it will be apparent to a person having ordinary skill in the art that the disclosed embodiments can be implemented for a large number of computing devices including, but not limited to, a desktop computer, a laptop, a personal digital assistant (PDA), a tablet computer (e.g., iPad®, Samsung Galaxy Tab®), and the like.

The print server 106 is a device or a computer that facilitates interconnection of the printing systems 108 and the computing device 104 over the network 102. The print server 106 accepts print jobs from the computing device 104 and sends the print jobs to the appropriate printing systems 108. The print server 106 supports a variety of industry standard or proprietary printing protocols. Examples of the printing protocols include, but are not limited to, Internet Printing Protocol, Line Printer Daemon protocol, Microsoft Network Printing protocol, NetWare, NetBIOS/NetBEUI, or JetDirect.

The printing systems 108 are accessible by a user operating the computing device 104 through the print server 106 over the network 102. A functionality of managing print jobs is implemented on the print server 106. The print server 106 is further explained in detail in conjunction with FIG. 2.

Figure 2:
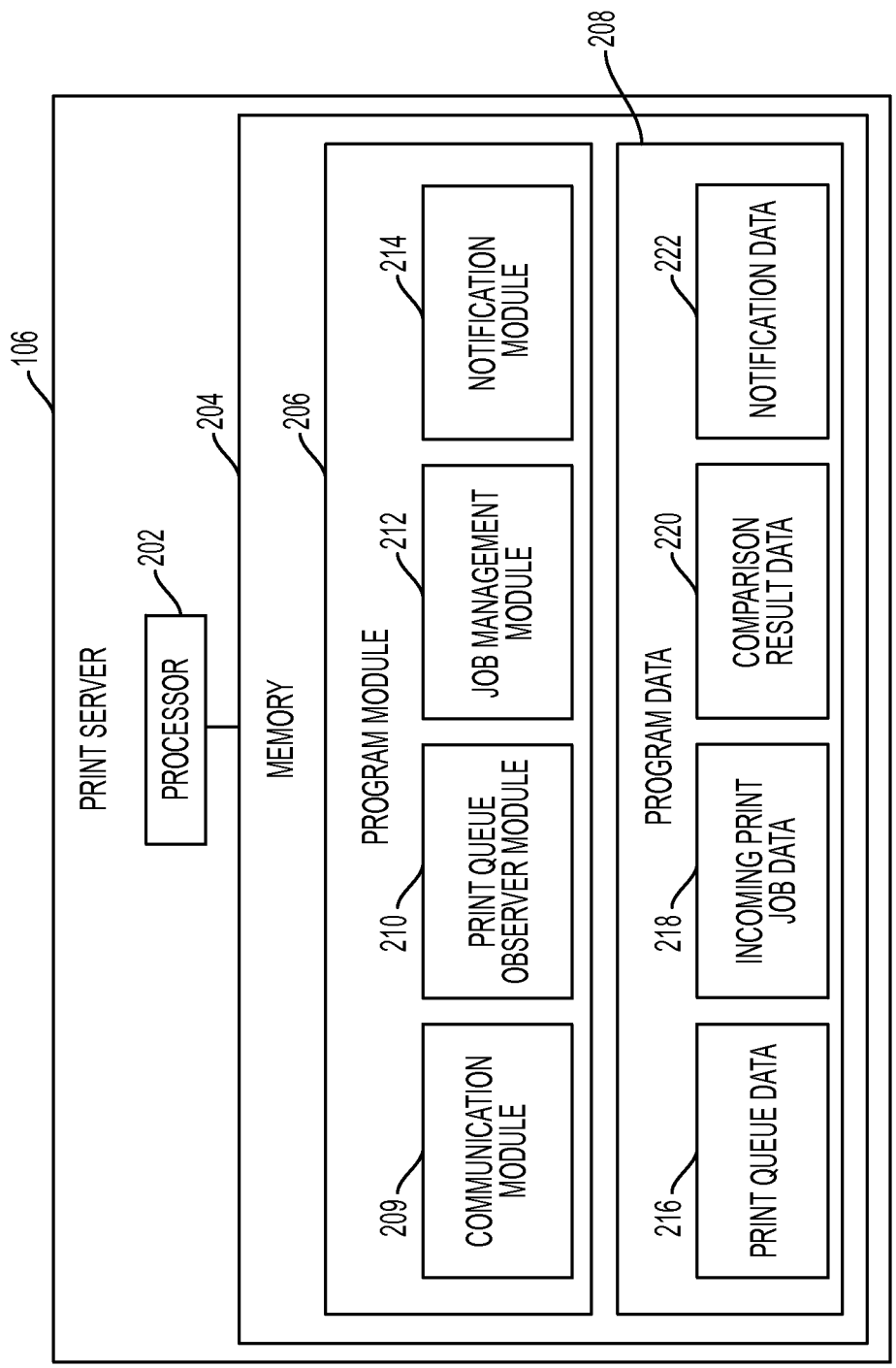
FIG. 2 is a block diagram illustrating a print server, in accordance with at least one embodiment.

FIG. 2 is a block diagram illustrating the print server 106 in accordance with at least one embodiment. The print server 106 includes a processor 202 and a memory 204. The memory 204 includes a program module 206 and a program data 208. The program module 206 includes a communication module 209, a print queue observer module 210, a job management module 212, and a notification module 214. The program data 208 includes a print queue data 216, an incoming print job data 218, a comparison result data 220, and a notification data 222. In an embodiment, in addition to the memory 204, the processor 202 may also be coupled to a display (not shown) and one or more input mediums (not shown).

The processor 202 executes a set of instructions stored in the memory 204 to perform one or more operations. The processor 202 can be realized through a number of processor technologies known in the art. Examples of the processor 202 include, but are not limited to, an X86 processor, a RISC processor, an ASIC processor, a CISC processor, or any other processor. In an embodiment, the processor 202 includes a Graphics Processing Unit (GPU) that executes the set of instructions to perform one or more image processing operations.

The memory 204 stores a set of instructions and data. Some of the commonly known memory implementations can be, but are not limited to, a Random Access Memory (RAM), Read Only Memory (ROM), Hard Disk Drive (HDD), and a secure digital (SD) card. The program module 206 includes a set of instructions that are executable by the processor 202 to perform specific actions to manage print jobs. It is understood by a person having ordinary skill in the art that the set of instructions in conjunction with various hardware of the print server 106 enable the print server 106 to perform various operations. During the execution of instructions, the print queue data 216, the incoming print job data 218, the comparison result data 220, and the notification data 222 may be accessed by the processor 202.

The print server 106 maintains the print queue data 216. The print queue data 216 contains one or more print queues. In an embodiment, a separate print queue is maintained for each of the printing systems 108. In another embodiment, a common print queue is maintained for the printing systems 108.

The communication module 209 receives a print job from the computing device 104. The communication module 209 then stores the received print job in the incoming print job data 218. Further, the communication module 209 forwards the print jobs from the one or more print queues to their corresponding printing system.

The print queue observer module 210 retrieves the received print job from the incoming print job data 218. The print queue observer module 210 then compares the received print job with pending print jobs and executed print jobs contained in the one or more print queues. The print queue observer module 210 then stores the results of the comparison in the comparison result data 220. In an embodiment, the results of the comparison include a list of one or more pending jobs that are found similar to the received print job. In another embodiment, the results of the comparison include a list of one or more executed jobs that are found similar to the received print job. In addition to the list of the one or more executed jobs similar to the received print job, identification detail of corresponding printing system of the printing systems 108 on which the print jobs are executed is also stored in the other data. For example, identification details, such as name, ID, and/or IP address of the printing system is stored as a part of the results of the comparison. In an embodiment, if no match is found for the received print job, a text such as "No match found" (or any other appropriate text) is stored in the comparison result data 220.

The print queue observer module 210 can be implemented using various comparison techniques capable of comparing various texts, symbols, images and/or visual representation of document pages extracted by Page Description Language (PDL) parser and/or PDL image rendering. The method of comparing the print jobs is further explained in detail in conjunction with FIG. 4.

The job management module 212 retrieves the results of the comparison from the comparison result data 220. In an embodiment, if the results of the comparison include the one or more pending print jobs that are similar to the received print job, the job management module 212 suspends the one or more pending print jobs that are similar to the received print job. This is done assuming that the received print job contains the most recent version (i.e., a revised version, an error-free/corrected version, or a version with proper print setup of the pages) of the electronic document in comparison to the pending print jobs.

In another embodiment, the job management module 212 suspends the received print job if the results of the comparison include one or more executed print jobs that are similar to the received print job.

In yet another embodiment, if no match is found for the received print job in any of the pending print jobs and the executed print jobs, the job management module 212 places the received print job in the pending print jobs of the appropriate print queue. In an embodiment, the no match condition is determined by the job management module 212 if the text, "No match found" (or any other appropriate text) is found in the comparison result data 220 for the received print job.

The notification module 214 retrieves the comparison results from the comparison result data 220. Based on the comparison results, the notification module 214 generates one or more notification messages. In an embodiment, the notification module 214 generates a first notification message after suspending the received print job in case the results of the comparison include one or more executed print jobs that are similar to the received print job. The first notification message is generated and presented to ask the associated user whether he/she wants to delete the recent print job (e.g., the received print job) or print the recent print job. Based on the response of the user, the job management module 212 takes an appropriate action (i.e., deleting or printing the one or more pending print jobs). In an embodiment, if the user's response is not received in a predefined time period (e.g., 10 seconds, 30 seconds, or 60 seconds), the job management module 212 deletes the received print job.

In another embodiment, the notification module 214 generates a second notification message after suspending the one or more pending print jobs that are similar to the received print jobs. The second notification message is generated and presented to ask the associated user whether he/she wants to delete the suspended print jobs (e.g., the one or more pending print jobs that are similar to the received print jobs) or print the suspended print jobs. Based on the response of the user, the job management module 212 takes an appropriate action (e.g., deleting or printing the suspended print jobs). In an embodiment, if the user's response is not received in the predefined time period (e.g., 10 seconds, 30 seconds, or 60 seconds), the job management module 212 deletes the suspended print jobs.

Once the notification messages (e.g., the first notification message and the second notification message) are generated based on the comparison, the notification module 214 stores the notification messages in the notification data 222.

In various embodiments, the notification messages are communicated to the associated user via at least one of an email, an SMS, an MMS, displaying the notification message on a webpage, displaying the notification message on a display of the computing device 104, or displaying the notification message on a display of the one or more printing systems 108.

As discussed earlier, the print queue data 216 contains one or more print queues. The incoming print job data 218 stores the newly received print jobs. The comparison result data 220 stores the results of the comparison performed by the print queue observer module 210. The notification data 222 stores the notification messages generated by the notification module 214. Each of the print queue data 216, the incoming print job data 218, the comparison result data 220, and the notification data 222 can be implemented as a database. The database can be implemented using technologies including, but not limited to Oracle®, IBM DB2®, Microsoft SQL Server®, Microsoft Access®, PostgreSQL®, MySQL® and SQLite®, and the like.

Figure 3A:
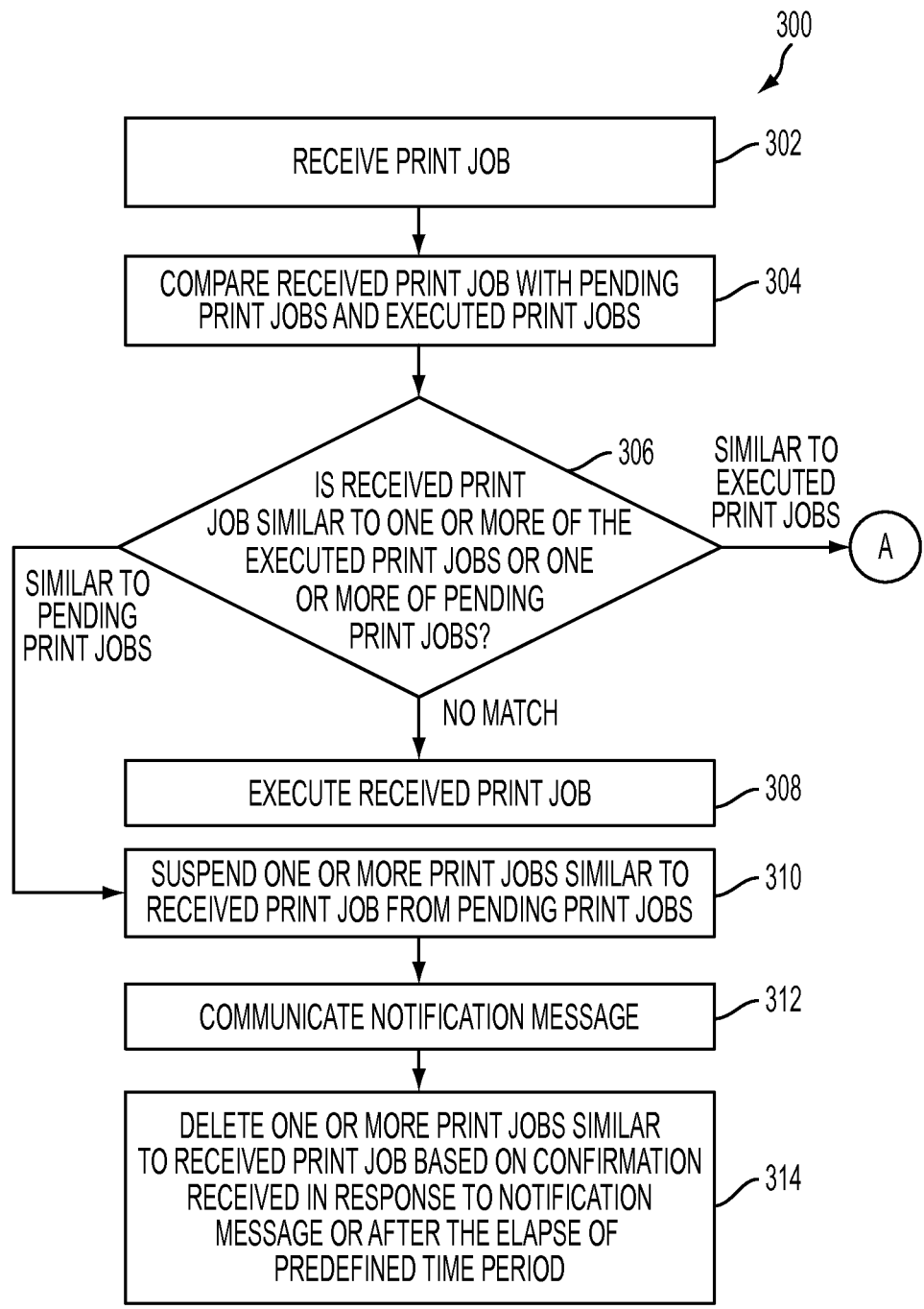
FIGS. 3A and 3B (combined, hereinafter referred to as FIG. 3) is a flow diagram illustrating a method for managing a print job, in accordance with at least one embodiment.
Figure 3B:
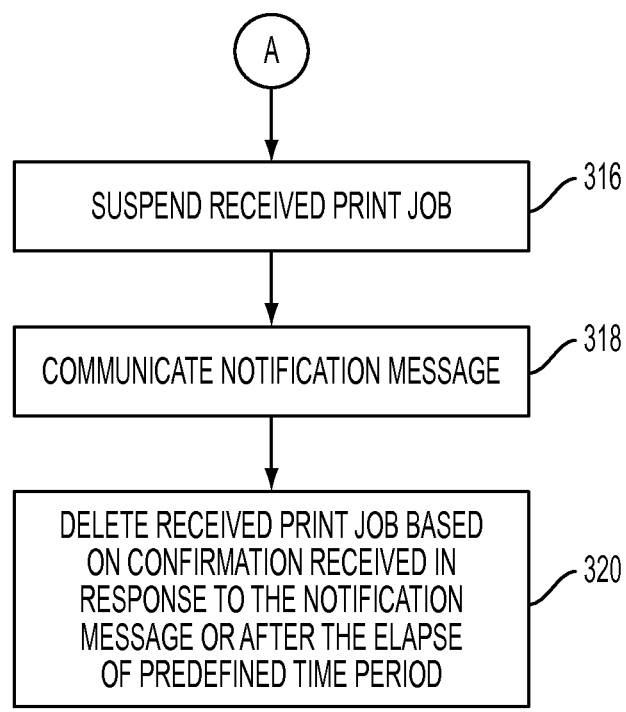

FIG. 3 is a flow diagram 300 illustrating a method for managing a print job in accordance with at least one embodiment.

At step 302, a print job is received. The print job is received at the print server 106 from the computing device 104. In an embodiment, the print job is received by the communication module 209 in the print server 106. The received print job is then stored in the incoming print job data 218 by the communication module 209.

At step 304, the received print job is compared with the pending print jobs and the executed print jobs. In an embodiment, the comparison is performed by the print queue observer module 210. One or more parameters are considered by the print queue observer module 210 to compare the received print job with pending print jobs and executed print jobs. Examples of the parameters include, but are not limited to, a user ID, a filename, file size, document length, or content of the electronic document. For example, a filename of an incoming electronic document (e.g., contained in the received print job) is compared with the filenames of the electronic documents associated with the pending print jobs and the executed print jobs. Similarly, it is apparent to a person having ordinary skill in the art that parameters other than the filename can also be compared with the corresponding parameters of the electronic documents associated with the pending print jobs and the executed print jobs without departing from the scope of the ongoing description. Further, the method of comparing the received print job with the pending print jobs and the executed print jobs is described in detail in conjunction with FIG. 4. The results of the comparison are then stored in the comparison result data 220 by the print queue observer module 210.

At step 306, it is determined whether the received print job is similar to one or more of the executed print jobs or one or more of the pending print jobs. In an embodiment, this is determined by the job management module 212 on the basis of the results of the comparison performed by the print queue observer module 210.

If it is determined at step 306 that there is no match for the received print job in any of the pending print jobs and the executed print jobs, step 308 is executed.

At step 308, the received print job is executed (i.e., printed). The job management module 212 places the received print job in the pending print jobs of the appropriate print queue. The appropriate print queue is determined on the basis of target printer details contained in the print job. In an embodiment, the target printing system is defined by the user while initiating the print job. In an embodiment, the no-match condition is determined by the job management module 212 if the text, "No match found" (or any other appropriate text) is found in the comparison result data 220 for the received print job. The electronic document contained in the received print job will be printed according to the order defined in the print queue containing the received print job.

If it is determined at step 306 that one or more pending print jobs are similar to the received print job, step 310 is executed. At step 310, the one or more pending print jobs that are similar to the received print job are suspended.

At step 312, a notification message (e.g., the second notification message) is communicated. In an embodiment, the second notification message is communicated to the associated user (i.e., a user who initiated the received print job) by the notification module 214. Further, the generation of the second notification message and the techniques of communicating the second notification message are discussed in FIG. 2.

At step 314, the one or more pending print jobs similar to the received print job are deleted or printed based on confirmation received in response to the notification message (e.g., the second notification message) or after the elapse of the predefined time period. In an embodiment, the one or more pending print jobs similar to the received print job are deleted by the job management module 212.

If it is determined at step 306 that one or more executed print jobs are similar to the received print job, step 316 is executed. At step 316, the one or more executed print jobs that are similar to the received print job are suspended.

At step 318, a notification message (e.g., the first notification message) is communicated. In an embodiment, the first notification message is communicated to the associated user by the notification module 214. Further, the generation of the first notification message and the techniques of communicating the first notification message are discussed in FIG. 2.

At step 320, the received print job is deleted or printed based on the confirmation received in response to the notification message (e.g., the first notification message) or after the elapse of the predefined time period. In an embodiment, the received print job is deleted by the job management module 212.

Figure 4:
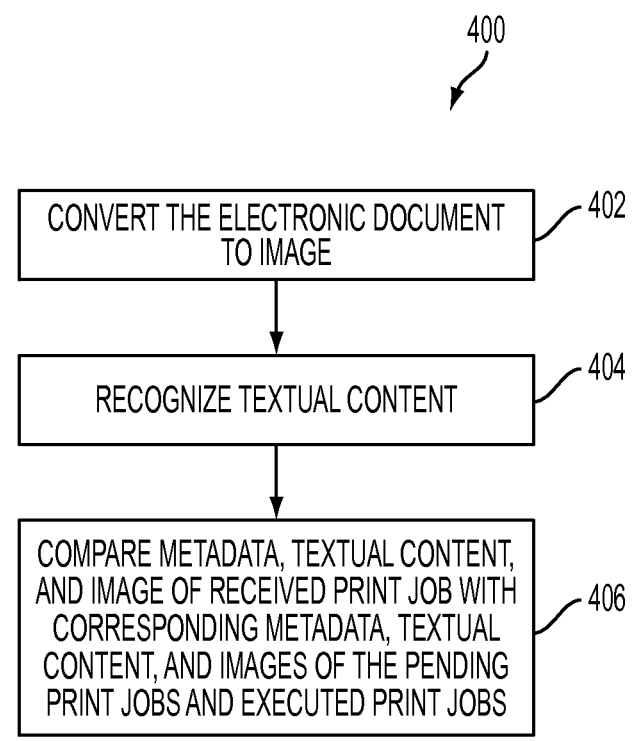
FIG. 4 is a flow diagram illustrating a method for comparing received print job with pending print jobs and executed print jobs in accordance with at least one embodiment.

FIG. 4 is a flow diagram 400 illustrating a method for comparing received print job with pending print jobs and executed print jobs in accordance with at least one embodiment.

At step 402, the electronic document (e.g., an MS Word® document) contained in the received print job is converted into a regular image at the desired resolution. In an embodiment, the electronic document is received in the form of Page Description Language (PDL) file. Thus, an image (e.g., bitmap image) is created for the electronic document to be printed. In an embodiment, if the electronic document includes multiple pages then the corresponding number of images will be created.

At step 404, text characters are recognized. In an embodiment, an Optical Character Recognition (OCR) is performed on the image to recognize various elements in the image as text characters. In another embodiment, the text characters can be directly recognized from the PDL file by parsing the text from the PDL file. In an embodiment, once the characters are recognized they may be grouped to create various words and sentences.

In an embodiment, various metadata such as, a user ID, a filename, file size, and length the electronic document, may be obtained from the PDL file.

At step 406, comparison is performed based on the metadata, the image, and the recognized text.

In an embodiment, the metadata associated with the received print job is compared with the corresponding metadata of the pending print jobs and the executed print jobs.

For text comparison, the recognized text (e.g., text recognized text from the image or PDL file) is represented as weighted bag-of-words. In an embodiment, importance of the words is determined based on a product of term frequencies (TF) or inverse document frequencies (IDF). Thereafter, cosine distance between the weighted bag-of-words of the received print job and weighted bag-of-words of the pending print jobs and the executed print jobs, is calculated to determine the similarity.

In another embodiment, a language model and cross-entropy based technique is used to determine the similarity. Such language modelling technique is described in publication by Jay M. Ponte, titled "A language modelling approach to information retrieval", in SIGIR, pages 275-281, (ACM 1998), incorporated herein by reference. In an embodiment, the below equation may be used to determine the similarity:

$$sim(q, d) = \sum_{w} P(w|\theta_q) \log(P(w|\theta_d))$$

where, $\theta_q$ represents language model based on probabilistic representation (smoothed term frequency) for the electronic document in the received print job, $\theta_d$ represents language model based on probabilistic representation (smoothed term frequency) for any document contained in the pending or executed print jobs with which the document in the received print job is being compared, and $P(w|\theta_d)$ represents a probability that the language model $\theta_d$ would generate the term w.

For image comparison, following approach may be used: The image is divided into the multi-scale grid. Thereafter, low level features such as SIFT or Local Color Statistics are determined. Once the features are determined, a visual vocabulary is built using K-means clustering technique or Gaussian Mixture Models (GMM). Thereafter, Bag-of-Visual words or Fisher-Vector representation is obtained. A publication disclosing the visual categorization based on visual vocabulary titled "Visual categorization with bags of keypoints", by one or more of the present inventors, are incorporated herein by reference. Further, the Fisher-Vector representation is described further in U.S. Pat. No. 7,680,341, titled "Generic Visual Classification With Gradient Components-based Dimensionality Enhancement" by Florent Perronnin, and US Publication No. 2010/0189354, titled "Modeling Images As Sets Of Weighted Features" by Teofilo E. DeCampos et al, incorporated herein by reference.

Thereafter, in an embodiment, a dot-product between the Bag-of-Visual words representation of the image (e.g., image in the received print job) and the Bag-of-Visual words representation of each of the images contained in the pending print jobs and the executed print jobs, is obtained. In another embodiment, a dot-product between the Fisher-Vector representation of the image (e.g., image in the received print job) and the Fisher-Vector representation of each of the images contained in the pending print jobs and the executed print jobs, is obtained. It is understood that the dot product is indicative of the similarity between the two representations. In an embodiment, other measures, such as the Earth Mover's Distance as disclosed in "A Metric for Distributions with Applications to Image Databases", by Jossi Rubner; Carlo Tomasi, Leonidas J. Guibas, in Proceedings ICCV 1998, can also be used to determine similarity between the Bag-of-Visual words.

Further, it is understood that the metadata, weighted bag-of-words, Bag-of-Visual words representations, and the Fisher-Vector representations for the pending print jobs and the executed print jobs is determined when the print jobs are received, and stored in the print queue data along with corresponding print jobs.

In an embodiment, the comparison of the metadata, text, and images is performed in cascade. For example, if the metadata comparison is failed (e.g., no match between the metadata of the received print job and that of the pending print jobs and the executed print jobs), the text and image comparisons will not be performed. Similarly, if the text comparison fails, the image comparison will not be performed.

In an embodiment, if a match is found for the user ID and the filename, the similarity is determined based on a weighted average between text and image similarities.

The disclosed methods and systems, as illustrated in the ongoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard disk drive or a removable storage drive, such as, a floppy disk drive, optical disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through an input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in computers. The instructions for the disclosure can be written in all programming languages including, but not limited to, 'C', 'C++', 'Visual C++', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. Some of these advantages may include, but are not limited to preventing unnecessary re-printing of documents. The methods and system compels the user to reconsider some of the prints, leading to a greener technology. By preventing the unnecessary re-printing of documents unnecessary paper usage can be minimized, resulting in saving trees.

Various embodiments of the methods and systems for managing print jobs have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed in:

1. A method for managing a print job, the method comprising:
    receiving the print job from a computing device, wherein the received print job comprises an electronic document intended to be printed;
    comparing the received print job with pending print jobs and executed print jobs, wherein the pending print jobs and the executed print jobs are stored in one or more print queues associated with one or more printing systems, and wherein the comparison is performed by comparing content of the electronic document contained in the received print job with content of electronic documents contained in the pending print jobs and the executed print jobs, the content comparison being performed in a cascade of metadata comparison, text comparison, and image comparison;
    suspending one or more of the pending print jobs when the one or more pending print jobs are determined to be similar to the received print job;
    suspending the received print job when the received print job is determined to be similar to one or more of the executed print jobs; and
    deleting the one or more suspended pending print jobs or the suspended received print job based on at least one of a confirmation by a user, or an elapse of a predefined time period.

2. The method of claim 1, wherein the comparison of the received print job with the pending print jobs and the executed print jobs is performed further based on electronic document length of the electronic document and electronic document length of the electronic documents contained in the pending print jobs and the executed print jobs.

3. The method of claim 1, wherein the comparison of the content of the electronic document with content of the electronic documents contained in the pending print jobs and the executed print jobs is based on at least one of textual content or image content of a Page Description Language (PDL) file associated with the electronic document and PDL files associated with the electronic documents contained in the pending print jobs and the executed print jobs.

4. The method of claim 3 further comprising converting the PDL files into one or more images, wherein the one more images correspond to the image content.

5. The method of claim 4, wherein the comparison of the image content is performed based on a Bag-of-Visual (BoV) word representation or Fisher-Vector representation.

6. The method of claim 4 further comprising performing Optical Character Recognition (OCR) operation on the one or more images to recognize the textual content.

7. The method of claim 6, wherein the comparison of the textual content is performed based on a language model based text representation.

8. The method of claim 1 further comprising:
    notifying the user based on the comparison of the received print job with the pending print jobs and the executed print jobs; and
    receiving the confirmation from the user for deleting or printing of the one or more suspended pending print jobs or the suspended received print job.

9. The method of claim 8, wherein the notifying comprises at least one of:
    communicating a notification message via an email,
    communicating the notification message via an SMS or an MMS,
    displaying the notification message on a webpage, displaying the notification message on a display of the computing device, or displaying the notification message on a display of the one or more printing systems.

10. The method of claim 8, wherein the notifying comprises informing the user of a printing system corresponding to the one or more of the executed print jobs.

11. The method of claim 1, wherein the content comprises textual content and image content, wherein comparison between content of the electronic document contained in the received print job and content of electronic documents contained in the pending print jobs and the executed print jobs is performed when textual content of the electronic document contained in the received print job matches with textual content of the electronic documents contained either in the pending print jobs or the executed print jobs.

12. The method of claim 1, wherein the comparison of the received print job with the pending print jobs and the executed print jobs is performed further based on a user ID for the compared print jobs.

13. The method of claim 1, wherein comparing content of the electronic document contained in the received print job and content of electronic documents contained in the pending print jobs and the executed print jobs in a cascade further comprises:

performing a metadata comparison between the content of the electronic document contained in the received print job and the content of electronic documents contained in the pending print jobs and the executed print jobs;

performing, when the metadata comparison is a match, a textual comparison between the content of the electronic document contained in the received print job and the content of electronic documents contained in the pending print jobs and the executed print jobs; and performing, when the textual comparison is a match, an image comparison between the content of the electronic document contained in the received print job and the content of electronic documents contained in the pending print jobs and the executed print jobs.

14. A system for managing a print job, the system comprising:

a print queue observer module configured for comparing a received print job with pending print jobs and executed print jobs, wherein the comparison is performed by comparing content of an electronic document contained in the received print job with content of electronic documents contained in the pending print jobs and executed print jobs, the content comparison being performed in a cascade of metadata comparison, text comparison, and image comparison; and a job management module configured for:

suspending one or more of the pending print jobs when the one or more pending print jobs are determined to be similar to the received print job;

suspending the received print job when the received print job is determined to be similar to one or more of the executed print jobs; and a notification module configured for generating a notification message asking a user for allowing deletion or printing of the one or more suspended pending print jobs or the suspended received print job.

15. The system of claim 14 further comprising a database for storing one or more print queues associated with one or more printing systems, wherein the one or more print queues comprises the pending print jobs and the executed print jobs.

16. The system of claim 14 further comprising a communication module configured for:

receiving the print job from a computing device; and forwarding the print job to one or more printing systems.

17. The system of claim 16, wherein the print queue observer module is further configured to perform the comparison of the received print job with pending print jobs and executed print jobs based on at least one of a user ID, a filename of the electronic document, file size of the electronic document, electronic document length of the electronic document contained in the received print job.

18. The system of claim 14, wherein the notification message comprises information on a printing system corresponding to the one or more of the executed print jobs.

19. A non-transitory computer readable medium, having stored thereon, a computer program for managing a print job, the computer program having at least one code section executable by a computer, thereby causing the computer to perform steps comprising:

comparing a received print job with pending print jobs and executed print jobs, wherein the pending print jobs and the executed print jobs are stored in one or more print queues associated with one or more printing systems, and wherein the comparison is performed by comparing content of an electronic document contained in the received print job with content of electronic documents contained in the pending print jobs and executed print jobs, the content comparison being performed in a cascade of metadata comparison, text comparison, and image comparison;

suspending one or more of the pending print jobs when the one or more pending print jobs are determined to be similar to the received print job;

suspending the received print job when the received print job is determined to be similar to one or more of the executed print jobs; and deleting the one or more suspended pending print jobs or the suspended received print job based on at least one of a confirmation by a user, or an elapse of a predefined time period.

* * * * *